(12) United States Patent
Tsukamoto et al.

(10) Patent No.: US 11,329,695 B2
(45) Date of Patent: May 10, 2022

(54) POWER SUPPLY APPARATUS, POWER SUPPLY METHOD, AND RECORDING MEDIUM

(71) Applicant: CANON KABUSHIKI KAISHA, Tokyo (JP)

(72) Inventors: Nobuyuki Tsukamoto, Tokyo (JP); Katsuya Nakano, Yokohama (JP); Marie Tateno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 16/583,032

(22) Filed: Sep. 25, 2019

(65) Prior Publication Data

US 2020/0021335 A1    Jan. 16, 2020

Related U.S. Application Data

(63) Continuation of application No. 14/226,697, filed on Mar. 26, 2014, now Pat. No. 10,469,131.

(30) Foreign Application Priority Data

Mar. 29, 2013 (JP) .................. 2013-073646

(51) Int. Cl.
*H02J 50/80* (2016.01)
*H02J 50/12* (2016.01)
*H04B 5/00* (2006.01)
*H02J 50/60* (2016.01)
*H02J 50/40* (2016.01)
*H02J 7/02* (2016.01)
*H02J 7/00* (2006.01)

(52) U.S. Cl.
CPC ........ *H04B 5/0037* (2013.01); *H02J 7/00036* (2020.01); *H02J 7/025* (2013.01); *H02J 50/12* (2016.02); *H02J 50/40* (2016.02); *H02J 50/60* (2016.02); *H02J 50/80* (2016.02); *H02J 7/00034* (2020.01); *H02J 7/00045* (2020.01)

(58) Field of Classification Search
CPC ........ H04B 5/0037; H02J 50/80; H02J 50/12; H02J 50/40; H02J 50/60; H02J 7/00036; H02J 7/025; H02J 7/00045; H02J 7/0034
USPC ........................................ 307/104
See application file for complete search history.

(56) References Cited

U.S. PATENT DOCUMENTS

| | | | | |
|---|---|---|---|---|
| 2012/0235508 A1* | 9/2012 | Ichikawa | ............... | H02J 50/80 307/104 |
| 2012/0242160 A1* | 9/2012 | Tseng | .................. | H04B 5/0037 307/104 |
| 2012/0299389 A1* | 11/2012 | Lee | ......................... | H02J 7/025 307/104 |
| 2013/0119778 A1* | 5/2013 | Jung | ....................... | H01F 38/14 307/104 |

(Continued)

*Primary Examiner* — Daniel Cavallari
*Assistant Examiner* — Swarna N Chowdhuri
(74) *Attorney, Agent, or Firm* — Canon U.S.A., Inc. IP Division

(57) ABSTRACT

A power supply apparatus includes a power supply unit configured to wirelessly supply power to an electronic apparatus, a communication unit configured to communicate with the electronic apparatus, and a control unit configured to perform control whether to supply power to the electronic apparatus according to whether the electronic apparatus is capable of updating information about the electronic apparatus.

11 Claims, 9 Drawing Sheets

(56) References Cited

U.S. PATENT DOCUMENTS

| | | | | |
|---|---|---|---|---|
| 2013/0260676 A1* | 10/2013 | Singh | ............... | H04B 5/0068 |
| | | | | 455/41.1 |
| 2013/0324039 A1* | 12/2013 | Horiguchi | ............ | H04B 5/0037 |
| | | | | 455/41.1 |
| 2014/0001879 A1* | 1/2014 | Van Wageningen | ......................... | |
| | | | | G01R 21/133 |
| | | | | 307/104 |
| 2014/0349573 A1* | 11/2014 | Moes | ..................... | H02J 50/40 |
| | | | | 455/41.1 |
| 2015/0084736 A1* | 3/2015 | Horton | ................ | H04B 5/0056 |
| | | | | 340/5.7 |
| 2015/0084972 A1* | 3/2015 | Wu | ....................... | H04W 4/80 |
| | | | | 345/520 |
| 2015/0180268 A1* | 6/2015 | Byun | ..................... | H02J 50/60 |
| | | | | 320/108 |
| 2016/0314423 A1* | 10/2016 | Mole | ............... | G06Q 10/06393 |

\* cited by examiner

FIRST TAG

SECOND TAG

POWER SUPPLY APPARATUS, POWER SUPPLY METHOD, AND RECORDING MEDIUM

CROSS-REFERENCE TO RELATED APPLICATION

This application is a Continuation of U.S. application Ser. No. 14/226,697, filed Mar. 26, 2014, which claims priority from Japanese Patent Application No. 2013-073646 filed Mar. 29, 2013, which are hereby incorporated by reference herein in their entireties.

BACKGROUND

Technical Field

The present disclosure relates to a power supply apparatus for wirelessly supplying power.

Description of the Related Art

In recent years, there has been known a power supply system including a power supply apparatus for wirelessly supplying power without connection via connectors, and an electronic apparatus for receiving power wirelessly supplied from the power supply apparatus. Japanese Patent Application Laid-Open No. 2010-39283 discusses an electronic apparatus charging a battery to by the power supplied from a power supply apparatus in such a power supply system.

In such a power supply system, it has not been considered that the power supply apparatus and the electronic apparatus communicate with each other, and the power supply apparatus controls the wireless power supply based on the result of the communication with the electronic apparatus. Therefore, the power supply apparatus has been unable to correctly detect the function and status of the electronic apparatus, and therefore unable to suitably control the power supply to the electronic apparatus.

SUMMARY

An aspect of the present invention is directed to a power supply apparatus capable of controlling a power supply apparatus to suitably supply power to an electronic apparatus according to a communication between the power supply apparatus and the electronic apparatus.

According to an aspect of the present invention, at least one of the above-described drawbacks and disadvantages can be overcome.

According to another aspect of the present invention, a power supply apparatus includes a power supply unit configured to wirelessly supply power to an electronic apparatus, a communication unit configured to communicate with the electronic apparatus, and a control unit configured to perform control whether to supply power to the electronic apparatus according to whether the electronic apparatus is capable of updating information about the electronic apparatus.

According to another aspect of the present invention, a method includes wirelessly supplying power to an electronic apparatus, communicating with the electronic apparatus, and performing control whether to supply power to the electronic apparatus according to whether the electronic apparatus is capable of updating information about the electronic apparatus.

According to another aspect of the present invention, a recording medium recording a program for causing a computer to execute a method that includes wirelessly supplying power to an electronic apparatus, communicating with the electronic apparatus, and performing control whether to supply power to the electronic apparatus according to whether the electronic apparatus is capable of updating information about the electronic apparatus.

According to another aspect of the present invention, a power supply apparatus includes a power supply unit configured to wirelessly supply power to an electronic apparatus, a communication unit configured to communicate with the electronic apparatus, and a control unit configured to perform control whether to supply power to the electronic apparatus according to whether the electronic apparatus is capable of notifying the power supply apparatus of information about the electronic apparatus.

According to another aspect of the present invention, a method includes wirelessly supplying power to an electronic apparatus, communicating with the electronic apparatus, and performing control whether to supply power to the electronic apparatus according to whether the electronic apparatus is capable of notifying the power supply apparatus of information about the electronic apparatus.

According to another aspect of the present invention, a recording medium recording a program for causing a computer to execute a method that includes wirelessly supplying power to an electronic apparatus, communicating with the electronic apparatus, and performing control whether to supply power to the electronic apparatus according to whether the electronic apparatus is capable of notifying the power supply apparatus of information about the electronic apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the invention will be described in detail below with reference to the drawings.

A first exemplary embodiment of the present invention will be described below with reference to the accompanying drawings.

Figure 1:
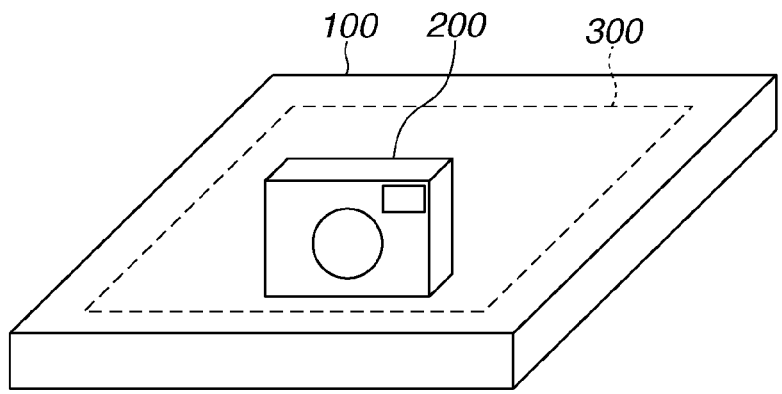
FIG. 1 illustrates an example of a wireless power supply system according to a first exemplary embodiment of the present invention.

As illustrated in FIG. 1, a power supply system according to the first exemplary embodiment includes a power supply apparatus 100 and an electronic apparatus 200. In the power supply system according to the first exemplary embodiment, when the electronic apparatus 200 exists in a predetermined range 300 from the power supply apparatus 100, the power supply apparatus 100 wirelessly supplies power to the electronic apparatus 200. When the electronic apparatus 200 exists in the predetermined range 300, the electronic apparatus 200 can wirelessly receive power output from the power supply apparatus 100. If the electronic apparatus 200 does not exist in the predetermined range 300, the electronic apparatus 200 cannot receive power from the power supply apparatus 100. The power supply apparatus 100 can communicate with the electronic apparatus 200 existing in the predetermined range 300. For example, the predetermined range 300 may be a range separated from the housing of the power supply apparatus 100 as long as the power supply apparatus 100 can communicate with the electronic apparatus 200 existing in the relevant range. The power supply apparatus 100 may wirelessly supply power to a plurality of electronic apparatuses.

The electronic apparatus 200 may be an imaging apparatus, a reproducing apparatus, or a communication apparatus, such as a mobile phone or a smart phone. The electronic apparatus 200 may be a battery pack including a battery. Further, the electronic apparatus 200 may be an automobile, a display, or a personal computer.

Figure 2:
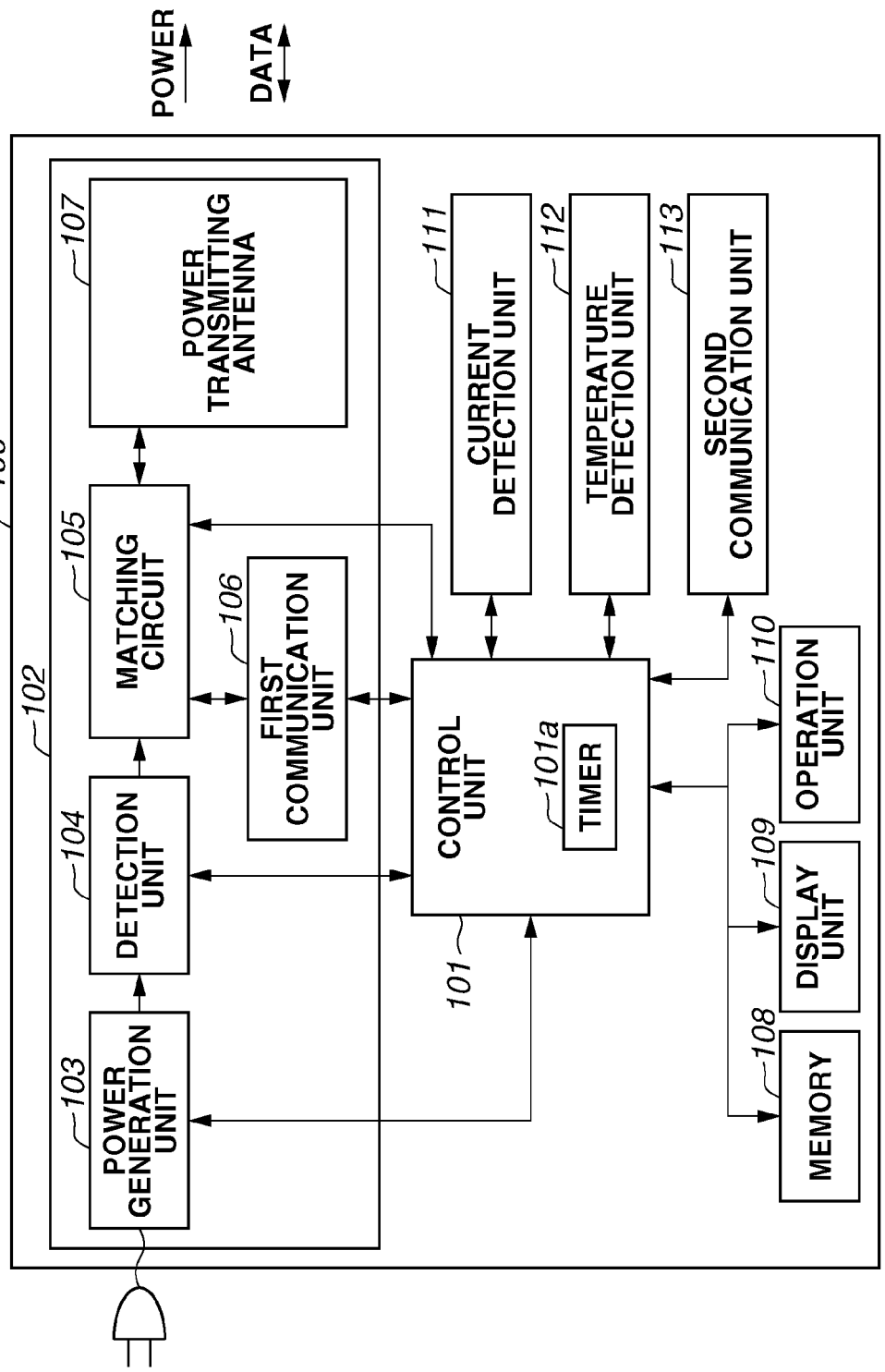
FIG. 2 is a block diagram illustrating an example of a power supply apparatus according to the first exemplary embodiment of the present invention.

An example of a configuration of the power supply apparatus 100 according to the first exemplary embodiment will be described below with reference to FIG. 2. As illustrated in FIG. 2, the power supply apparatus 100 includes a control unit 101, a power supply unit 102, a memory 108, a display unit 109, an operation unit 110, a current detection unit 111, a temperature detection unit 112, and a second communication unit 113. The power supply unit 102 includes a power generation unit 103, a detection unit 104, a matching circuit 105, a first communication unit 106, and a power transmitting antenna 107.

The control unit 101 controls the power supply apparatus 100 by executing a computer program stored in the memory 108. The control unit 101 includes, for example, a central processing unit (CPU) or a micro processing unit (MPU). The control unit 101 may be configured by hardware. The control unit 101 further includes a timer 101a.

The power supply unit 102 is used to wirelessly supply power based on a predetermined power supply method. The predetermined power supply method is a power supply method using, for example, a magnetic resonance method. With the magnetic resonance method, the power supply apparatus 100 transmits power to the electronic apparatus 200 in a state where the resonance occurs between the power supply apparatus 100 and the electronic apparatus 200. The state where the resonance occurs between the power supply apparatus 100 and the electronic apparatus 200 is a state where the resonance frequency of the power transmitting antenna 107 of the power supply apparatus 100 matches to the resonance frequency of the power receiving antenna 203 of the electronic apparatus 200. The predetermined power supply method may be a power supply method using a method other than the magnetic resonance method.

When an alternating current (AC) power source (not illustrated) is connected to the power supply apparatus 100, the power generation unit 103 generates power to be output to the outside via the power transmitting antenna 107 by using the power supplied from the AC power source (not illustrated).

The power generated by the power generation unit 103 includes the communication power and the predetermined power. The communication power is used by the first communication unit 106 to communicate with the electronic apparatus 200. The communication power may be, for example, the weak power of 1 W or less. The communication power may be the power specified in the communication standard for the first communication unit 106. The predetermined power is used by the electronic apparatus 200 to perform charging and a specific operation. The predetermined power may be, for example, the power of 2 W or more. The predetermined power is not limited to the power of 2 W or more as long as it is larger than the communication power. The predetermined power value is set by the control unit 101 based on data acquired from the electronic apparatus 200.

The power generated by the power generation unit 103 is supplied to the power transmitting antenna 107 via the detection unit 104 and the matching circuit 105.

The detection unit 104 detects the voltage standing wave ratio (VSWR) to detect the state of the resonance between the power supply apparatus 100 and the electronic apparatus 200. The detection unit 104 further supplies data indicating the detected VSWR to the control unit 101. The VSWR value indicates the relation between the traveling wave of the power output from the power transmitting antenna 107 and the reflected wave of the power output from the power transmitting antenna 107. The control unit 101 can detect a change in the state of the resonance between the power supply apparatus 100 and the electronic apparatus 200 and the existence of a foreign object by using the VSWR data supplied from the detection unit 104. A foreign object is, for example, a metal or an integrated circuit (IC) card. A foreign object may be an apparatus not having a charging unit for charging a battery, an apparatus not having a communication unit for communicating with the power supply apparatus 100, or an apparatus not conforming to the communication standard for the first communication unit 106.

The matching circuit 105 includes a circuit for setting the resonance frequency of the power transmitting antenna 107, and a circuit for performing impedance matching between the power generation unit 103 and the power transmitting antenna 107.

When the power supply apparatus 100 outputs either one of the communication power and the predetermined power via the power transmitting antenna 107, the control unit 101 controls the matching circuit 105 to set the resonance frequency of the power transmitting antenna 107 to a predetermined frequency f. The predetermined frequency f is, for example, 13.56 MHz. The predetermined frequency f may be 6.78 MHz or a frequency specified in the communication standard for the first communication unit 106.

The first communication unit 106 performs wireless communication, for example, based on the Near Field Communication (NFC) standard specified by the NFC forum. The communication standard for the first communication unit 106 may be the International Organization for Standardization/International Electrotechnical Commission (ISO/IEC) 18092 standard, the ISO/IEC 14443 standard, or the ISO/IEC 21481 standard. While the communication power is being output from the power transmitting antenna 107, the first communication unit 106 can perform data exchange for wirelessly supplying the power to the electronic apparatus 200 between the power supply apparatus 100 and the electronic apparatus 200 via the power transmitting antenna 107. However, while the predetermined power is being output from the power transmitting antenna 107, the first communication unit 106 does not communicate with the electronic apparatus 200 via the power transmitting antenna 107. The time period during which the predetermined power is being output from the power transmitting antenna 107 is hereinafter referred to as "predetermined time period". The predetermined time period is set by the control unit 101 based on data acquired from the electronic apparatus 200.

Data exchanged between the first communication unit 106 and the electronic apparatus 200 conforms to the NFC Data Exchange Format (NDEF).

When the first communication unit 106 transmits data conforming to the NDEF to the electronic apparatus 200, the first communication unit 106 performs processing for superimposing the data onto the communication power supplied from the power generation unit 103. The communication power having the data superimposed thereon is transmitted to the electronic apparatus 200 via the power transmitting antenna 107.

When the first communication unit 106 receives data conforming to the NDEF from the electronic apparatus 200, the first communication unit 106 detects the current flowing to the power transmitting antenna 107, and receives the data from the electronic apparatus 200 according to the result of the current detection. This is because, when the electronic apparatus 200 transmits data conforming to the NDEF to the power supply apparatus 100, the electronic apparatus 200 transmits the data by fluctuating the internal load of the electronic apparatus 200. Since the current flowing to the power transmitting antenna 107 changes when the internal load of the electronic apparatus 200 changes, the first communication unit 106 can receive data conforming to the NDEF from the electronic apparatus 200 by detecting the current flowing to the power transmitting antenna 107.

The first communication unit 106 operates as a reader writer specified in the NFC Standard.

The power transmitting antenna 107 is an antenna for outputting either one of the communication power and the predetermined power to the electronic apparatus 200. The power transmitting antenna 107 is used by the first communication unit 106 to perform NFC Standard-based wireless communication with the electronic apparatus 200.

The memory 108 stores a computer program for controlling the power supply apparatus 100. The memory 108 further stores identification data of the power supply apparatus 100, power supply parameters related to the power supply apparatus 100, and flags for controlling the power supply. The memory 108 further stores data acquired from the electronic apparatus 200 by at least one of the first communication unit 106 and the second communication unit 113.

The display unit 109 displays image data supplied from the memory 108 and the second communication unit 113.

The operation unit 110 provides the user with a user interface for operating the power supply apparatus 100. The operation unit 110 includes buttons, switches, and a touch panel for operating the power supply apparatus 100. The control unit 101 controls the power supply apparatus 100 according to an input signal input via the operation unit 110.

The current detection unit 111 detects the current flowing to the power transmitting antenna 107, and supplies data indicating the detected current to the control unit 101. The control unit 101 can detect the existence of a foreign object by using the current data supplied from the current detection unit 111.

The temperature detection unit 112 detects the temperature of the power supply apparatus 100, and supplies data indicating the detected temperature to the control unit 101. The control unit 101 can detect the existence of a foreign object by using the temperature data supplied from the temperature detection unit 112. The temperature of the power supply apparatus 100 detected by the temperature detection unit 112 may be the internal temperature of the power supply apparatus 100 or the surface temperature of the power supply apparatus 100.

The second communication unit 113 wirelessly communicates with the electronic apparatus 200 based on a communication standard different from the communication standard for the first communication unit 106. The communication standard for the second communication unit 113 is, for example, the wireless local area network (LAN) standard and the Bluetooth (registered trademark) standard. The second communication unit 113 enables exchanging between the power supply apparatus 100 and the electronic apparatus 200 data including at least one of moving image data, sound data, and a command.

The power supply apparatus 100 wirelessly supplies power to the electronic apparatus 200. However, the word "wireless" may be replaced by "non-contact" or "no contact".

Figure 3:
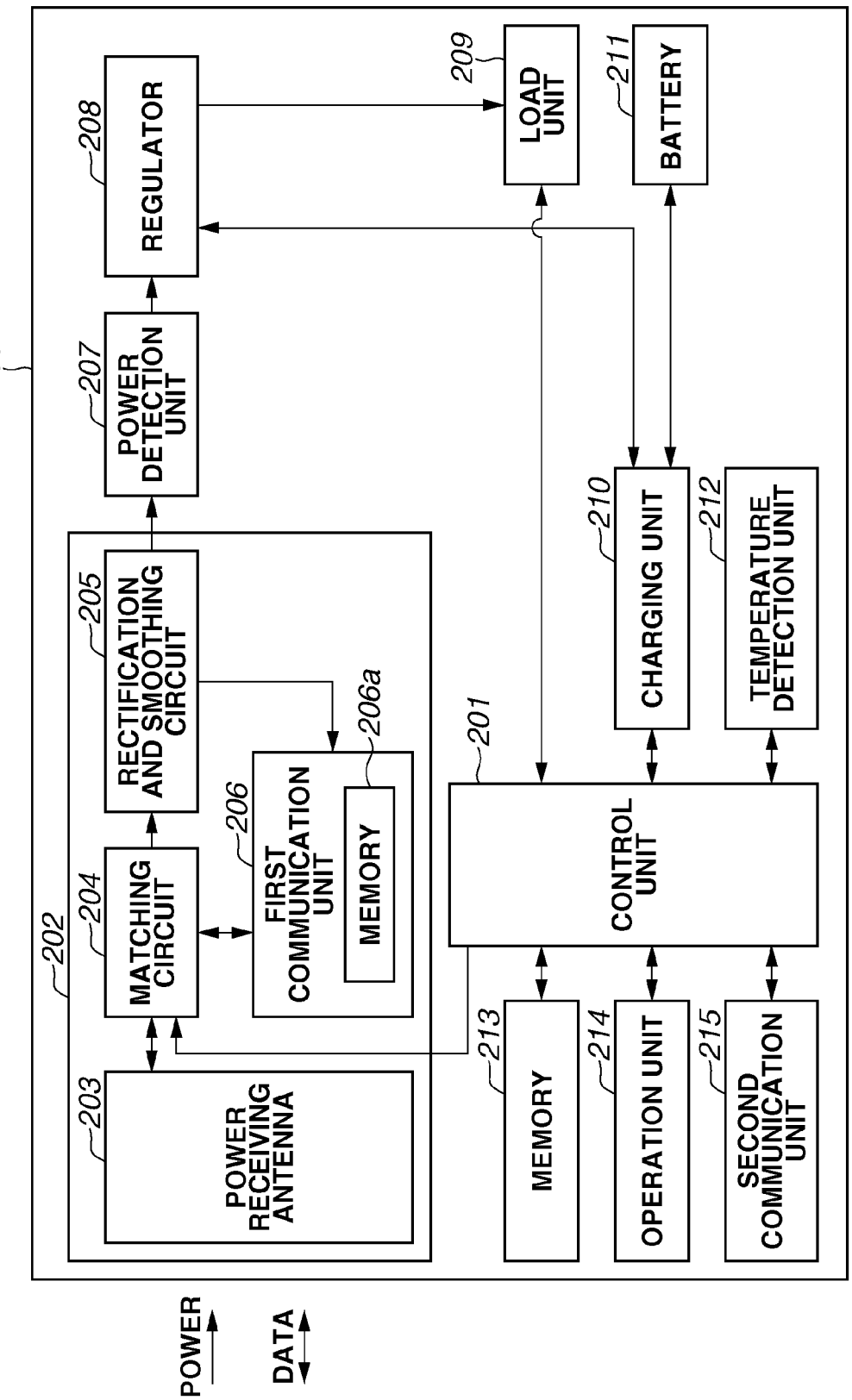
FIG. 3 is a block diagram illustrating an example of an electronic apparatus according to the first exemplary embodiment of the present invention.

An example of a configuration of the electronic apparatus 200 will be described below with reference to FIG. 3. The electronic apparatus 200 includes a control unit 201, a power reception unit 202, a power detection unit 207, a regulator 208, a load unit 209, a charging unit 210, a battery 211, a temperature detection unit 212, a memory 213, an operation unit 214, and a second communication unit 215. The power reception unit 202 includes a power receiving antenna 203, a matching circuit 204, a rectification and smoothing circuit 205, and a first communication unit 206.

The control unit 201 controls the electronic apparatus 200 by executing a computer program stored in the memory 213. The control unit 201 includes, for example, a CPU or an MPU. The control unit 201 is configured by hardware.

The power reception unit 202 conforms to the predetermined power supply method, and is used to wirelessly receive the power from the power supply apparatus 100.

The power receiving antenna 203 is an antenna for receiving power supplied from the power supply apparatus 100. The power receiving antenna 203 is further used by the first communication unit 206 to perform NFC Standard-based wireless communication with the power supply apparatus 100. The power received by the electronic apparatus 200 from the power supply apparatus 100 via the power receiving antenna 203 is supplied to the rectification and smoothing circuit 205 via the matching circuit 204.

The matching circuit 204 includes a circuit for setting the resonance frequency of the power receiving antenna 203.

The control unit 201 can set the resonance frequency of the power receiving antenna 203 by controlling the matching circuit 204.

The rectification and smoothing circuit 205 generates direct current (DC) power based on the power received by the power receiving antenna 203. The rectification and smoothing circuit 205 further supplies the generated DC power to the regulator 208 via the power detection unit 207. When the power received by the power receiving antenna 203 includes data superimposed thereon, the rectification and smoothing circuit 205 supplies to the first communication unit 206 the data extracted from the power received by the power receiving antenna 203.

The first communication unit 206 communicates with the power supply apparatus 100 based on the same communication standard as the first communication unit 106. The first communication unit 206 includes a memory 206a. Store Type Definition (RTD) data for Wireless Power Transfer (WPT) 400 (predetermined data) is stored on the memory 206a. The RTD data for WPT 400 stores a plurality of data items conforming to the NDEF. The RTD data for WPT 400 stores data required to wirelessly supply power between the power supply apparatus 100 and the electronic apparatus 200. Data required to wirelessly supply power between the power supply apparatus 100 and the electronic apparatus 200 conforms to the NDEF.

The RTD data for WPT 400 stores at least authentication data used to perform authentication for wireless power supply with the power supply apparatus 100. The authentication data includes the store type name, data indicating the power supply method and power supply control protocol employed by the electronic apparatus 200, identification data of the electronic apparatus 200, power receiving capability data of the electronic apparatus 200, and data indicating tag types that the electronic apparatus 200 has. The store type name is data indicating the store type for identifying the contents and structure of data stored in the RTD data for WPT 400. The store type name is used to identify the RTD data for WPT 400. The power receiving capability data indicates the power receiving capability of the electronic apparatus 200, for example, the maximum value of the power receivable by the electronic apparatus 200.

The RTD data for WPT 400 may further store power receiving status data and power supply status data. The power receiving status data includes data indicating the status of the electronic apparatus 200. For example, the power receiving status data includes the value of the requested power requested from the electronic apparatus 200 to the power supply apparatus 100, the value of the power received by the electronic apparatus 200 from the power supply apparatus 100, data related to the remaining capacity of the battery 211 and charging of the battery 211, error data related to an error of the electronic apparatus 200. The error data includes data indicating whether an error has occurred on the electronic apparatus 200, and data indicating the type of the error. The power supply status data includes data indicating the status of the power supply apparatus 100. For example, the power supply status data includes the identification data of the power supply apparatus 100, data indicating whether the power supply apparatus 100 starts the transmission of the predetermined power to the electronic apparatus 200, and the power supply parameters set by the power supply apparatus 100.

The first communication unit 206 analyzes data supplied from the rectification and smoothing circuit 205. Then, based on the result of the data analysis, the first communication unit 206 transmits to the power supply apparatus 100 data read from the RTD data for WPT 400, and writes data received from the power supply apparatus 100 to the RTD data for WPT 400. Further, the first communication unit 206 transmits to the power supply apparatus 100 response data conforming to the data supplied from the rectification and smoothing circuit 205.

To transmit to the power supply apparatus 100 data read from the RTD data for WPT 400 and response data, the first communication unit 206 performs processing for fluctuating the internal load of the first communication unit 206.

Figure 4A:
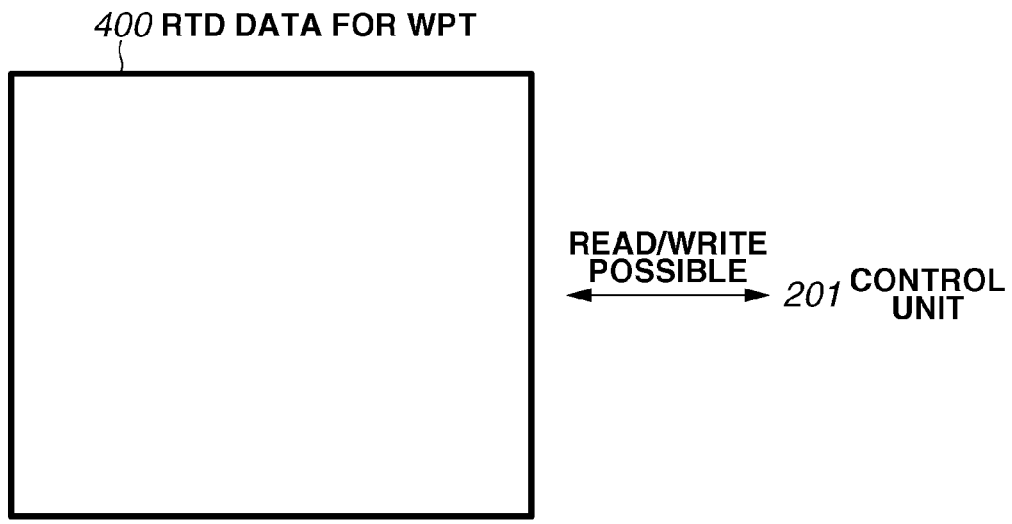
FIGS. 4A and 4B illustrate tag types applicable to the electronic apparatus according to the first exemplary embodiment of the present invention.
Figure 4B:
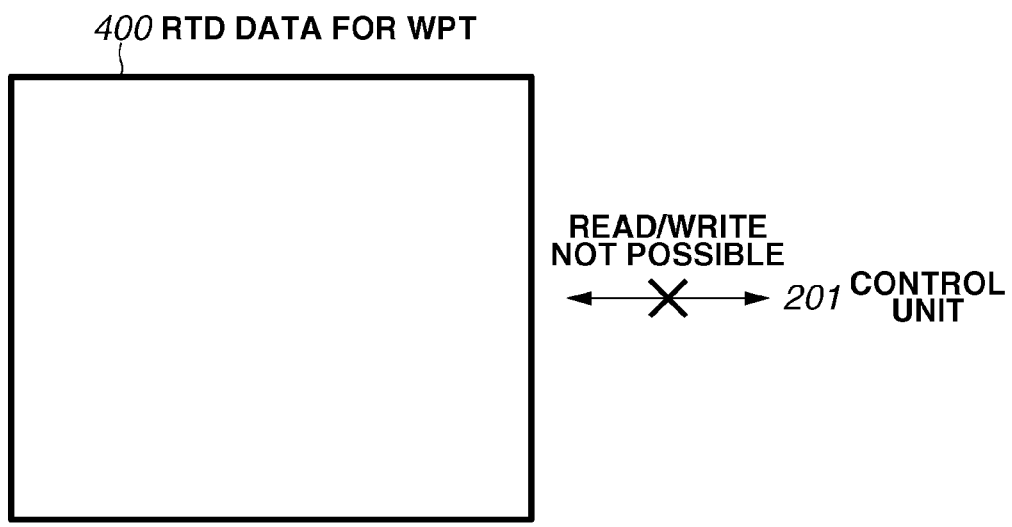

The electronic apparatus 200 conforms to the tags specified in the NFC Standard. First and second tags are tag types applicable to the electronic apparatus 200. The first and the second tags will be described below with reference to FIG. 4. FIG. 4A illustrates the first tag, and FIG. 4B illustrates the second tag.

The first tag will be described below with reference to FIG. 4A. The RTD data for WPT 400 illustrated in FIG. 4A stores the identification data including data indicating that the electronic apparatus 200 has the first tag. When the electronic apparatus 200 has the first tag, the control unit 201 can read via an internal bus interface (not illustrated) the data stored in the RTD data for WPT 400. Further, when the electronic apparatus 200 has the first tag, the control unit 201 can write data to the RTD data for WPT 400 via the internal bus interface (not illustrated).

When the electronic apparatus 200 has the first tag, for example, the control unit 201 can control each unit of the electronic apparatus 200 by using the power supply status data read from the RTD data for WPT 400. When the electronic apparatus 200 has the first tag, for example, the control unit 201 can periodically detect the power receiving status data by using data supplied from each unit of the electronic apparatus 200, and write the detected power receiving status data to the RTD data for WPT 400. The first tag can be referred to as "active tag" or "dynamic tag". As illustrated in FIG. 4A, the RTD data for WPT 400 when the electronic apparatus 200 has the first tag stores the identification data, the power receiving status data, and the power supply status data.

The second tag will be described below with reference to FIG. 4B. The RTD data for WPT 400 illustrated in FIG. 4B stores the identification data including data indicating that the electronic apparatus 200 has the second tag. When the electronic apparatus 200 has the second tag, the control unit 201 can neither read data stored in the RTD data for WPT 400 nor write data to the RTD data for WPT 400. In this case, for example, the control unit 201 cannot control the electronic apparatus 200 by using the power supply status data stored in the RTD data for WPT 400. Therefore, the control unit 201 can neither write nor add the power receiving status data to the RTD data for WPT 400. As illustrated in FIG. 4B, the RTD data for WPT 400 when the electronic apparatus 200 has the second tag stores the identification data but does not store the power receiving status data. The RTD data for WPT 400 when the electronic apparatus 200 has the second tag may store the power supply status data.

When the electronic apparatus 200 has at least one of the first and the second tags, the power supply apparatus 100 can read data stored in the RTD data for WPT 400, by using the first communication unit 106. Further, in this case, the power supply apparatus 100 can also write data to the RTD data for WPT 400 by using the first communication unit 106.

In the first exemplary embodiment, the configuration of the electronic apparatus 200 will be described below on the premise that the electronic apparatus 200 has the first tag.

The power detection unit 207 detects the power received via the power receiving antenna 203, and supplies data indicating the detected power to the control unit 201.

The control unit 201 determines whether a first error has occurred on the electronic apparatus 200 based on the power data supplied from the power detection unit 207. The first error is an error which occurs, for example, if the electronic apparatus 200 receives from the power supply apparatus 100 power larger than the maximum value of the power receivable by the electronic apparatus 200.

For example, the control unit 201 compares the maximum value of the power receivable by the electronic apparatus 200 with the value of the power detected by the power detection unit 207, and, based on the result of the comparison, determines whether the first error has occurred on the electronic apparatus 200. When the value of the power detected by the power detection unit 207 is larger than the maximum value of the power receivable by the electronic apparatus 200, the control unit 201 determines that the first error has occurred on the electronic apparatus 200. On the other hand, when the value of the power detected by the power detection unit 207 is equal to or smaller than the maximum value of the power receivable by the electronic apparatus 200, the control unit 201 determines that the first error has not occurred on the electronic apparatus 200. When the control unit 201 determines that the first error has occurred on the electronic apparatus 200, the control unit 201 writes to the RTD data for WPT 400 the power receiving status data including data indicating that an error occurred on the electronic apparatus 200, and data indicating the first error.

The control unit 201 further determines whether a second error has occurred on the electronic apparatus 200 based on the power data supplied from the power detection unit 207. The second error is an error which occurs, for example, if the power received by the electronic apparatus 200 from the power supply apparatus 100 is not sufficient for the requested power requested from the electronic apparatus 200 to the power supply apparatus 100.

For example, the control unit 201 compares the value of the requested power with the value of the power detected by the power detection unit 207, and, based on the result of the comparison, determines whether the second error has occurred on the electronic apparatus 200.

When the value of the power detected by the power detection unit 207 is smaller than the value of the requested power, the control unit 201 determines that the second error occurred on the electronic apparatus 200. On the other hand, when the value of the power detected by the power detection unit 207 is equal to or larger than the value of the requested power, the control unit 201 determines that the second error has not occurred on the electronic apparatus 200. When the control unit 201 determines that the second error occurred on the electronic apparatus 200, the control unit 201 writes to the RTD data for WPT 400 the power receiving status data including data indicating that an error has occurred on the electronic apparatus 200 and data indicating the second error.

In response to an instruction from the control unit 201, the regulator 208 supplies at least one of the power supplied from the rectification and smoothing circuit 205 and the power supplied from the battery 211 to each unit of the electronic apparatus 200.

The load unit 209 includes an imaging circuit for generating image data, such as a still image and a moving image, based on an optical image of the subject, and a reproduction circuit for reproducing image data.

The charging unit 210 charges the battery 211. In response to an instruction from the control unit 201, the charging unit 210 performs control whether the battery 211 is to be charged by using the power supplied from the regulator 208, or the power discharged from the battery 211 is to be supplied to the regulator 208. The charging unit 210 periodically detects the remaining capacity of the battery 211, and supplies data indicating the remaining capacity of the battery 211 and data related to charging of the battery 211 to the control unit 201.

The battery 211 is connectable to the electronic apparatus 200. The battery 211 is a rechargeable secondary battery, such as a lithium ion battery. The battery 211 may be other than a lithium ion battery.

The control unit 201 determines whether a third error occurred on the electronic apparatus 200 based on whether the electronic apparatus 200 and the battery 211 are connected. The third error is an error which occurs, for example, if the battery 211 is not connected to the electronic apparatus 200. When the electronic apparatus 200 and the battery 211 are not connected, the control unit 201 determines that the third error has occurred on the electronic apparatus 200. On the other hand, when the electronic apparatus 200 and the battery 211 are connected, the control unit 201 determines that the third error has not occurred on the electronic apparatus 200. When the control unit 201 determines that the third error has occurred on the electronic apparatus 200, the control unit 201 writes to the RTD data for WPT 400 the power receiving status data including data indicating that an error has occurred on the electronic apparatus 200 and data indicating the third error.

The temperature detection unit 212 detects the temperature of the electronic apparatus 200, and supplies data indicating the detected temperature to the control unit 201. The control unit 201 determines whether a fourth error has occurred on the electronic apparatus 200 based on the temperature data supplied from the temperature detection unit 212. The fourth error is an error which occurs, for example, if the temperature in the electronic apparatus 200 rises to a certain temperature.

The control unit 201 compares a setting value with the temperature detected by the temperature detection unit 212, and, based on the result of the comparison, determines whether the fourth error has occurred on the electronic apparatus 200. The setting value is, for example, the upper-limit value of the temperature set to normally charge the battery 211. Further, the setting value may be, for example, the upper-limit value of the temperature set to protect the power reception unit 202 and the load unit 209. When the temperature detected by the temperature detection unit 212 is higher than the setting value, the control unit 201 determines that the fourth error has occurred on the electronic apparatus 200. On the other hand, when the temperature detected by the temperature detection unit 212 is equal to or lower than the setting value, the control unit 201 determines that the fourth error has not occurred on the electronic apparatus 200. When the control unit 201 determines that the fourth error has occurred on the electronic apparatus 200, the control unit 201 writes to the RTD data for WPT 400 the power receiving status data including data indicating that an error has occurred on the electronic apparatus 200 and data indicating the fourth error.

The memory 213 stores a computer program for controlling the electronic apparatus 200 and data such as parameters related to the electronic apparatus 200.

The operation unit 214 provides a user with a user interface for operating the electronic apparatus 200. The control unit 201 controls the electronic apparatus 200 according to an input signal input via the operation unit 214.

The second communication unit 215 wirelessly communicates with the power supply apparatus 100. The second communication unit 215 wirelessly communicates with, for example, the power supply apparatus 100 based on the same communication standard as the second communication unit 113.

<State Transition Diagram of Power Supply Apparatus 100>

Figure 5:
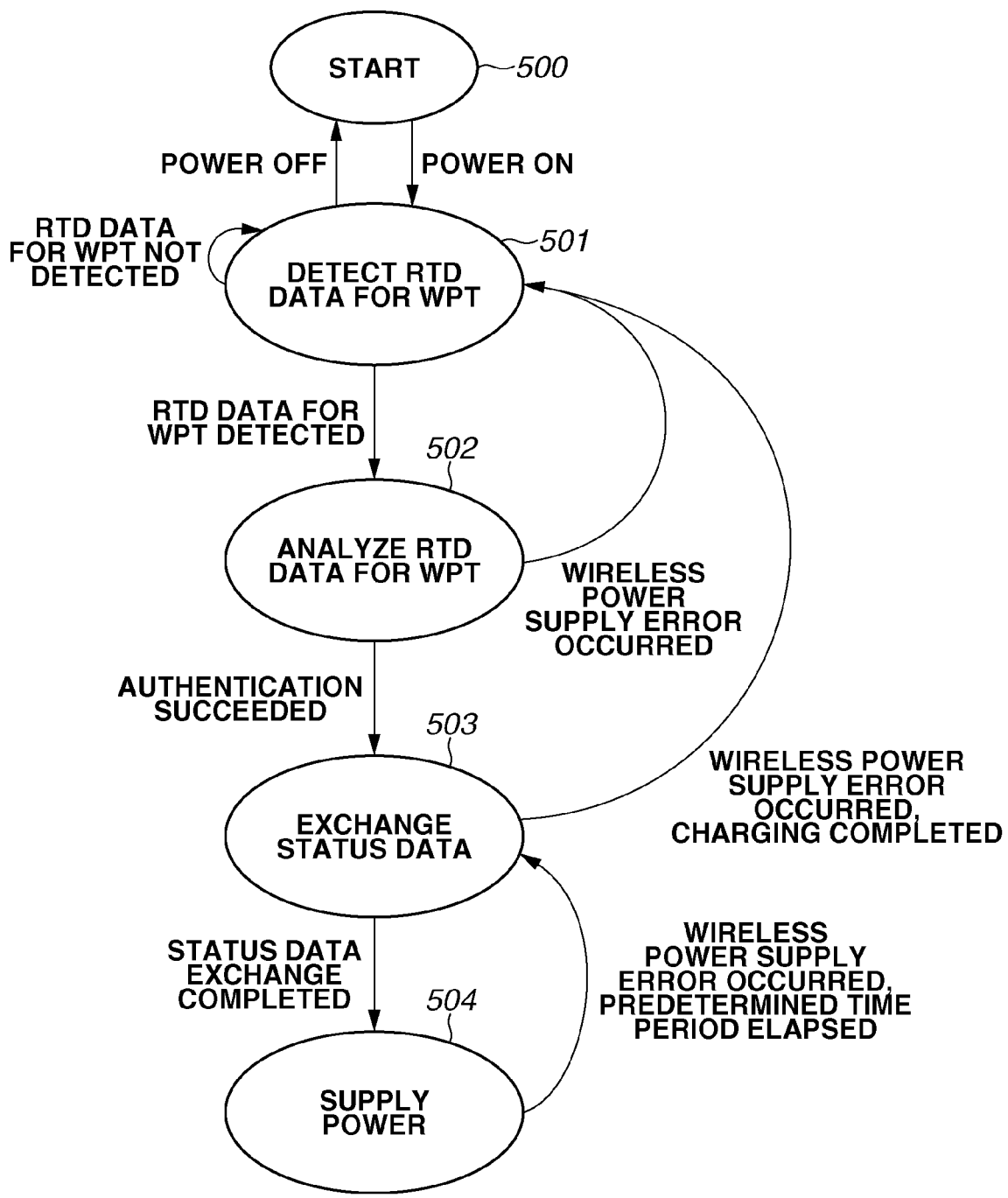
FIG. 5 illustrates an example of a state transition diagram for the power supply apparatus according to the first exemplary embodiment of the present invention.

State transition of the power supply apparatus 100 according to the first exemplary embodiment will be described below with reference to FIG. 5. Referring to FIG. 5, in a state 500, an AC power source (not illustrated) and the power supply apparatus 100 are connected, and the power supply apparatus 100 is turned OFF. In the state 500 of the power supply apparatus 100, when the power supply apparatus 100 is turned ON by using the operation unit 110, the power supply apparatus 100 enters the state 501.

In the state 501 of the power supply apparatus 100, the power supply apparatus 100 performs processing for detecting the RTD data for WPT 400. In the state 501 of the power supply apparatus 100, when the power supply apparatus 100 is turned OFF, the power supply apparatus 100 enters the state 500. In the state 501 of the power supply apparatus 100, when the power supply apparatus 100 detects the RTD data for WPT 400, the power supply apparatus 100 enters the state 502. When the power supply apparatus 100 has not detected the RTD data for WPT 400, or when the power supply apparatus 100 detects RTD data different from the RTD data for WPT 400, the power supply apparatus 100 remains in the state 501 until the power supply apparatus 100 detects the RTD data for WPT 400.

In the state 502 of the power supply apparatus 100, the power supply apparatus 100 performs processing for analyzing the detected RTD data for WPT 400. In the state 502 of the power supply apparatus 100, when the authentication for the wireless power supply between the power supply apparatus 100 and the electronic apparatus 200 is successfully completed as a result of the analysis of the RTD data for WPT 400, the power supply apparatus 100 enters the state 503. In the state 502 of the power supply apparatus 100, if an error related to the wireless power supply has occurred, the power supply apparatus 100 enters the state 501. An error related to the wireless power supply is, for example, a communication error related to the communication between the power supply apparatus 100 and the electronic apparatus 200, an error related to a foreign object, an error related to the electronic apparatus 200, and an authentication error related to the authentication for the wireless power supply between the power supply apparatus 100 and the electronic apparatus 200.

In the state 503 of the power supply apparatus 100, the power supply apparatus 100 performs processing for exchanging status data required to wirelessly supply power to the electronic apparatus 200. In the state 503 of the power supply apparatus 100, the power supply apparatus 100 receives power receiving status data from the electronic apparatus 200, and transmits the power supply status data to the electronic apparatus 200. In the state 503 of the power supply apparatus 100, when the status data exchange is completed, the power supply apparatus 100 enters the state 504. In the state 503 of the power supply apparatus 100, if an error related to the wireless power supply has occurred, the power supply apparatus 100 enters the state 501. In the state 503 of the power supply apparatus 100, when the completion of charging of the electronic apparatus 200 has been detected, the power supply apparatus 100 enters the state 501.

In the state 504 of the power supply apparatus 100, the power supply apparatus 100 performs power supply processing for supplying a predetermined power to the electronic apparatus 200. In the state 504 of the power supply apparatus 100, if an error related to the wireless power supply has occurred, the power supply apparatus 100 enters the state 503 from the state 504. In the state 504 of the power supply apparatus 100, if a predetermined time period has elapsed since the output of the predetermined power was started, the power supply apparatus 100 enters the state 503.

<Control Processing>

Figure 6:
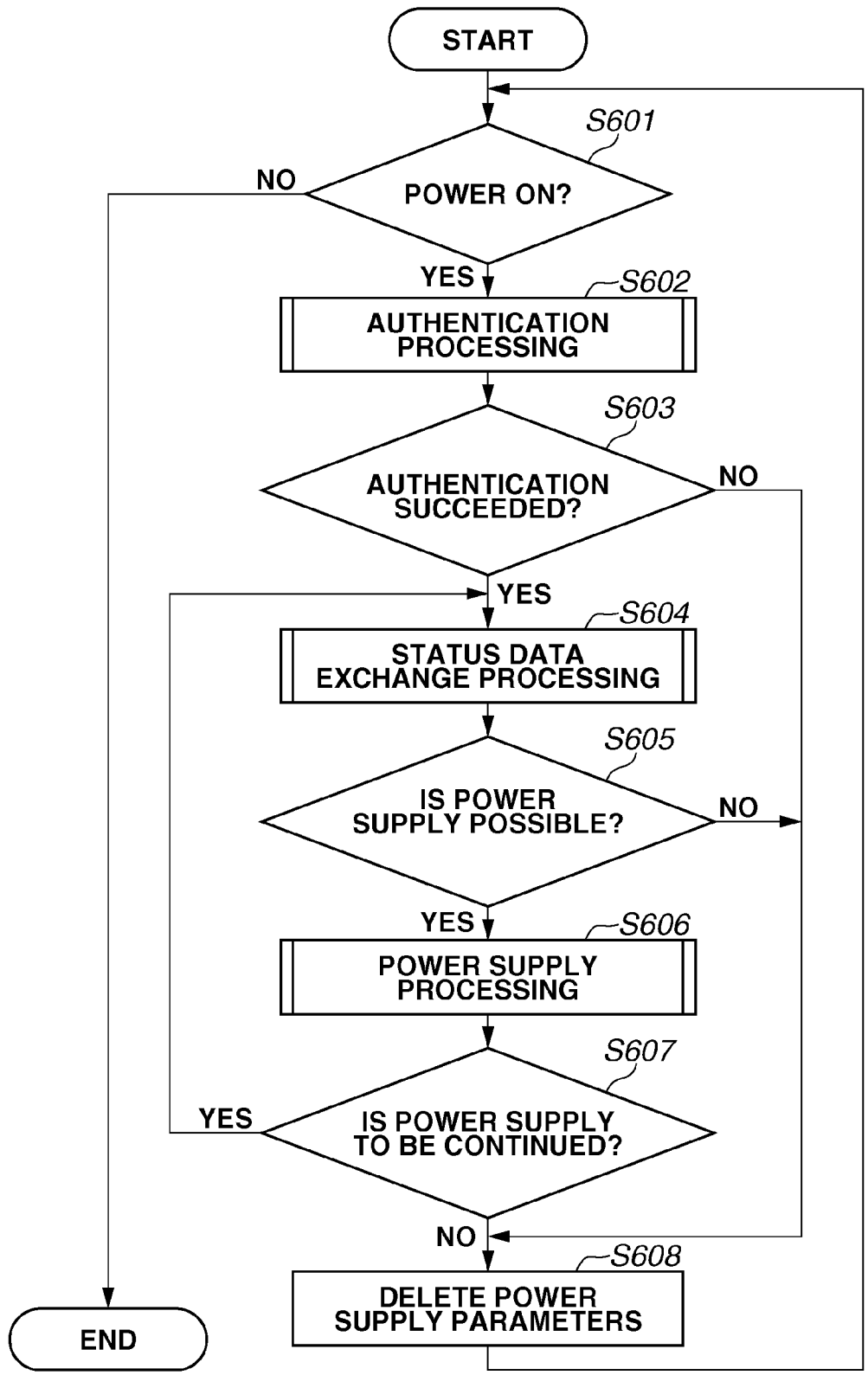
FIG. 6 is a flowchart illustrating an example of control processing performed by the power supply apparatus according to the first exemplary embodiment of the present invention.

Control processing for controlling the wireless power supply of the power supply apparatus 100 according to the first exemplary embodiment will be described below with reference to a flowchart illustrated in FIG. 6. The control processing is implemented when the control unit 101 executes a relevant computer program stored in the memory 108.

In step S601, the control unit 101 determines whether the power supply apparatus 100 is turned ON. When the power supply apparatus 100 is detected to be turned ON (YES in step S601), the processing proceeds to step S602. On the other hand, when the power of the power supply apparatus 100 is detected to be not turned ON (NO in step S601), the processing exits this flowchart.

In step S602, the control unit 101 performs authentication processing (described below). Upon completion of the authentication processing, the processing proceeds to step S603.

In step S603, the control unit 101 determines whether the authentication for the wireless power supply between the power supply apparatus 100 and the electronic apparatus 200 is successfully completed. Upon completion of the authentication processing in step S602, either one of an authentication success flag and an authentication failure flag is set to the memory 108. When the authentication success flag is set to the memory 108, the control unit 101 determines that the authentication for the wireless power supply has been successfully completed (YES in step S603), and the processing proceeds to step S604. On the other hand, when the authentication failure flag is set to the memory 108, the control unit 101 determines that the authentication for the wireless power supply has failed (NO in step S603), and the processing proceeds to step S608.

In step S604, the control unit 101 performs status data exchange processing (described below). Upon completion of the status data exchange processing in step S604, the processing proceeds to step S605.

In step S605, the control unit 101 determines whether the power supply apparatus 100 can supply the power to the electronic apparatus 200. Upon completion of the status data exchange processing in step S604, either one of a power supply enable flag and a power supply disable flag is set to the memory 108. When the power supply enable flag is set to the memory 108, the control unit 101 determines that the power supply apparatus 100 is capable of supplying the power to the electronic apparatus 200 (YES in step S605), and the processing proceeds to step S606. On the other hand, when the power supply disable flag is set to the memory 108, the control unit 101 determines that the power supply apparatus 100 is not capable of supplying the power to the electronic apparatus 200 (NO in step S605), and the processing proceeds to step S608.

In step S606, the control unit 101 performs power supply processing (described below). Upon completion of the power supply processing in step S606, the processing proceeds to step S607.

In step S607, the control unit 101 determines whether the power supply apparatus 100 continues supplying the power to the electronic apparatus 200. Upon completion of the power supply processing in step S606, either one of a power supply continuation flag and a power supply stop flag is set to the memory 108. When the power supply continuation flag is set to the memory 108, the control unit 201 determines that the power supply apparatus 100 continues the power supply to the electronic apparatus 200 (YES in step S607), and the processing returns to step S604. On the other hand, when the power supply stop flag is set to the memory 108, the control unit 101 determines that the power supply apparatus 100 does not continue the power supply to the electronic apparatus 200 (NO in step S607), and the processing proceeds to step S608.

In step S608, the control unit 101 deletes the power supply parameters stored in the memory 108 and the flags related to power supply control. Then, the processing returns to step S601.

<Authenticating Processing>

Authentication processing performed by the control unit 101 in step S602 in FIG. 6 according to the first exemplary embodiment will be described below with reference to the flowchart illustrated in FIG. 7. The authentication processing is implemented when the control unit 101 executes a relevant computer program stored in the memory 108.

In step S701, the control unit 101 controls the power supply unit 102 to output the communication power. The control unit 101 performs control so that the communication power is output via the power transmitting antenna 107 until the control unit 101 starts processing for outputting the predetermined power. The control unit 101 further controls the matching circuit 105 to set the resonance frequency of the power transmitting antenna 107 to the predetermined frequency f. Then, the processing proceeds to step S702.

In step S702, the control unit 101 controls the first communication unit 106 to transmit data for requesting the authentication data. Then, the processing proceeds to step S703.

In step S703, the control unit 101 determines whether the RTD data for WPT 400 has been detected. When the first communication unit 106 receives the authentication data from the electronic apparatus 200, the control unit 101 acquires the record type name of the electronic apparatus 200 from the authentication data of the electronic apparatus 200. Then, based on the record type name of the electronic apparatus 200, the control unit 101 determines whether the RTD data for WPT 400 has been detected. When the RTD data for WPT 400 has been detected (YES in step S703), the processing proceeds to step S704. On the other hand, when the RTD data for WPT 400 has not been detected (NO in step S703), the processing returns to step S702. Also when the first communication unit 106 has not received the authentication data from the electronic apparatus 200, the processing returns to step S702.

In step S704, the control unit 101 checks the data included in the authentication data of the electronic apparatus 200 to analyze the RTD data for WPT 400 of the electronic apparatus 200. Then, the processing proceeds to step S705.

In step S705, based on the result of the analysis in step S704, the control unit 101 determines whether a communication error has occurred in the authentication data of the electronic apparatus 200. When a communication error has been detected in the authentication data of the electronic apparatus 200 (YES in step S705), the processing proceeds to step S706. On the other hand, when a communication error has not been detected in the authentication data of the electronic apparatus 200 (NO in step S705), the processing proceeds to step S708.

In step S706, the control unit 101 causes the display unit 109 to display data indicating that an error of the communication between the power supply apparatus 100 and the electronic apparatus 200 has been detected. Then, the processing proceeds to step S707.

In step S707, the control unit 101 sets the authentication failure flag to the memory 108. Then, the processing exits this flowchart and proceeds to step S603 in FIG. 6.

If a foreign object is placed in the predetermined range 300, the VSWR detected by the detection unit 104 may rapidly change. Therefore, the power supply apparatus 100 performs processing in step S708 to determine whether a foreign object exists in the predetermined range 300.

In step S708, the control unit 101 determines whether the VSWR detected by the detection unit 104 has changed by a predetermined value or more. The predetermined value is a threshold value for identifying the existence of a foreign object. When the VSWR detected by the detection unit 104 has changed by the predetermined value or more (YES in step S708), the processing proceeds to step S709. On the other hand, when the VSWR detected by the detection unit 104 has not changed by the predetermined value or more (NO in step S708), the processing proceeds to step S710.

In step S709, the control unit 101 causes the display unit 109 to display data for notifying that a foreign object has been detected. Then, the processing proceeds to step S707.

In step S710, based on the result of the analysis in step S704, the control unit 101 determines whether the electronic apparatus 200 is applicable to the power supply apparatus 100.

For example, when the power supply method employed by the power supply apparatus 100 matches to the power supply method employed by the electronic apparatus 200, the control unit 101 determines that the electronic apparatus 200 is applicable to the power supply apparatus 100. On the other hand, when the power supply method employed by the power supply apparatus 100 does not match to the power supply method employed by the electronic apparatus 200, the control unit 101 determines that the electronic apparatus 200 is not applicable to the power supply apparatus 100.

For example, when the power supply control protocol employed by the power supply apparatus 100 matches to the power supply control protocol employed by the electronic apparatus 200, the control unit 101 determines that the electronic apparatus 200 is applicable to the power supply apparatus 100. On the other hand, when the power supply control protocol employed by the power supply apparatus 100 matches to the power supply control protocol employed by the electronic apparatus 200, the control unit 201 determines that the electronic apparatus 200 is not applicable to the power supply apparatus 100.

When the electronic apparatus 200 is not applicable to the power supply apparatus 100 (NO in step S710), the processing proceeds to step S711. On the other hand, when the electronic apparatus 200 is applicable to the power supply apparatus 100 (YES in step S710), the processing proceeds to step S712.

In step S711, the control unit 101 causes the display unit 109 to display data indicating that an error of authentication between the power supply apparatus 100 and the electronic apparatus 200 has been detected. Then, the processing proceeds to step S707.

In step S712, based on the result of the analysis in step S704, the control unit 101 determines whether the electronic apparatus 200 has the first tag. The control unit 101 determines whether the electronic apparatus 200 has the first tag according to whether the authentication data of the electronic apparatus 200 includes data indicating that the electronic apparatus 200 has the first tag. When the authentication data of the electronic apparatus 200 includes data indicating that the electronic apparatus 200 has the first tag, the control unit 101 determines that the electronic apparatus 200 has the first tag (YES in step S712), and the processing proceeds to step S713. On the other hand, when the authentication data of the electronic apparatus 200 does not include data indicating that the electronic apparatus 200 has the first tag, the control unit 101 determines that the electronic apparatus 200 does not have the first tag (NO in step S712), and the processing proceeds to step S711.

In step S713, the control unit 101 sets the authentication success flag to the memory 108. Then, the processing exits this flowchart and proceeds to step S603 in FIG. 6.

The control unit 101 may perform processing specified in the NFC Digital Protocol of the NFC Standard between steps S701 and S702.

Although, in step S708, the control unit 101 determines whether the VSWR detected by the detection unit 104 has changed by the predetermined value or more, the processing is not limited thereto.

If a foreign object is placed in the predetermined range 300, the current detected by the current detection unit 111 may rapidly increase. Therefore, in step S708, the control unit 101 may detect whether the current detected by the current detection unit 111 is equal to or larger than a predetermined current value. The predetermined current value is a threshold value for identifying the existence of a foreign object.

Figure 7:
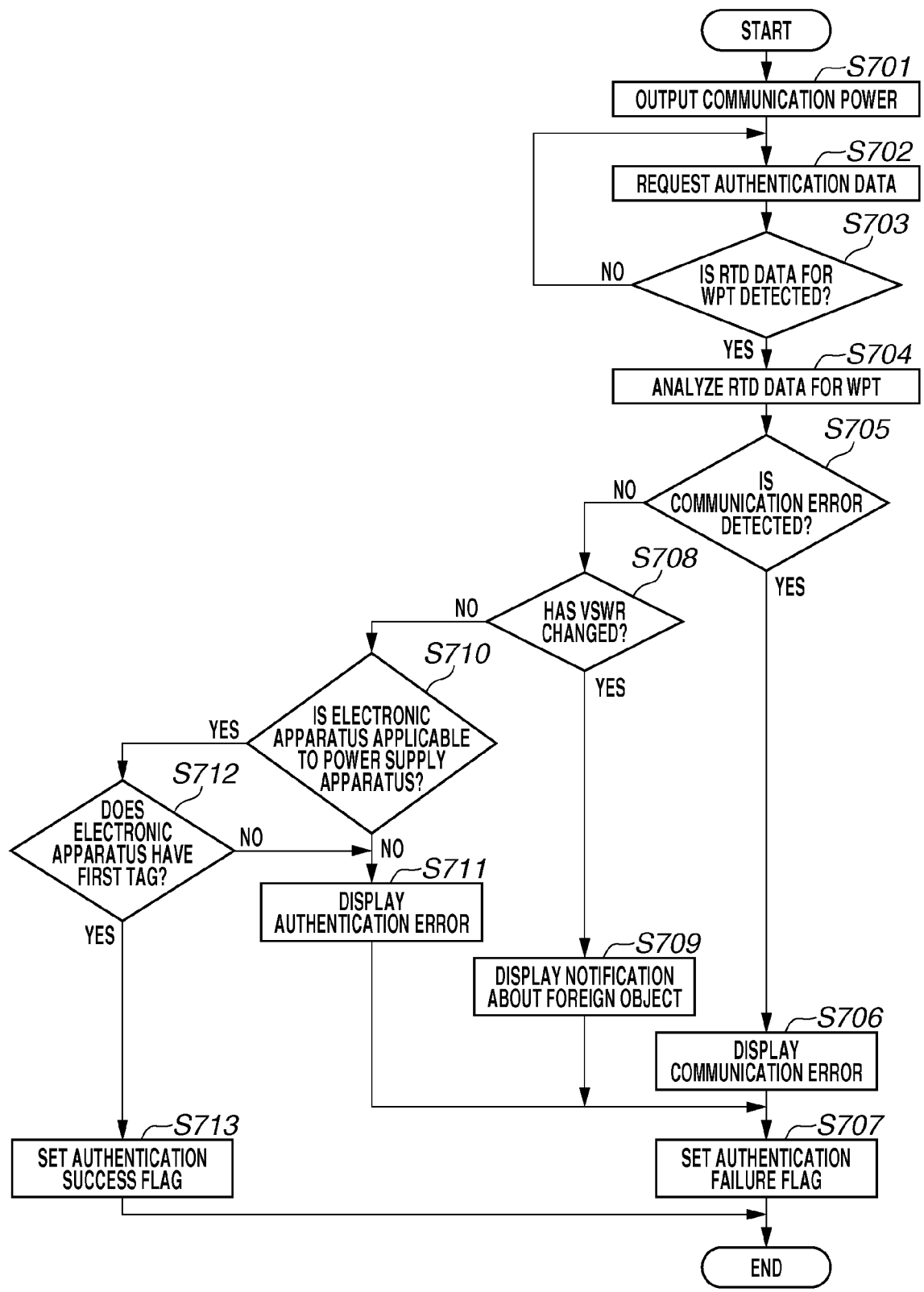
FIG. 7 is a flowchart illustrating an example of authentication processing performed by the power supply apparatus according to the first exemplary embodiment of the present invention.

When the current detected by the current detection unit 111 is equal to or larger than the predetermined current value, the processing of the flowchart in FIG. 7 proceeds to step S709 from step S708 similar to the case where the VSWR has changed by the predetermined value or more (YES in step S708). On the other hand, when the current detected by the current detection unit 111 is smaller than the predetermined current value, the processing of the flowchart in FIG. 7 proceeds to step S710 from S708 similar to the case where the VSWR has not changed by the predetermined value or more (NO in step S708).

When a foreign object is placed in the predetermined range 300, the temperature detected by the temperature detection unit 112 may rapidly rise. Therefore, in step S708, the control unit 101 may detect whether the temperature detected by the temperature detection unit 112 is equal to or higher than a predetermined temperature. The predetermined temperature is a threshold value for identifying the existence of a foreign object.

When the temperature detected by the temperature detection unit 112 is equal to or higher than the predetermined temperature, the processing of the flowchart in FIG. 7 proceeds to step S709 from S708 similar to the case where the VSWR has changed by the predetermined value or more (YES in step S708). On the other hand, when the temperature detected by the temperature detection unit 112 is lower than the predetermined temperature, the processing of the flowchart in FIG. 7 proceeds to step S710 from S708 similar to the case where the VSWR has not changed by the predetermined value or more (NO in step S708).

<Status Data Exchange Processing>

Figure 8:
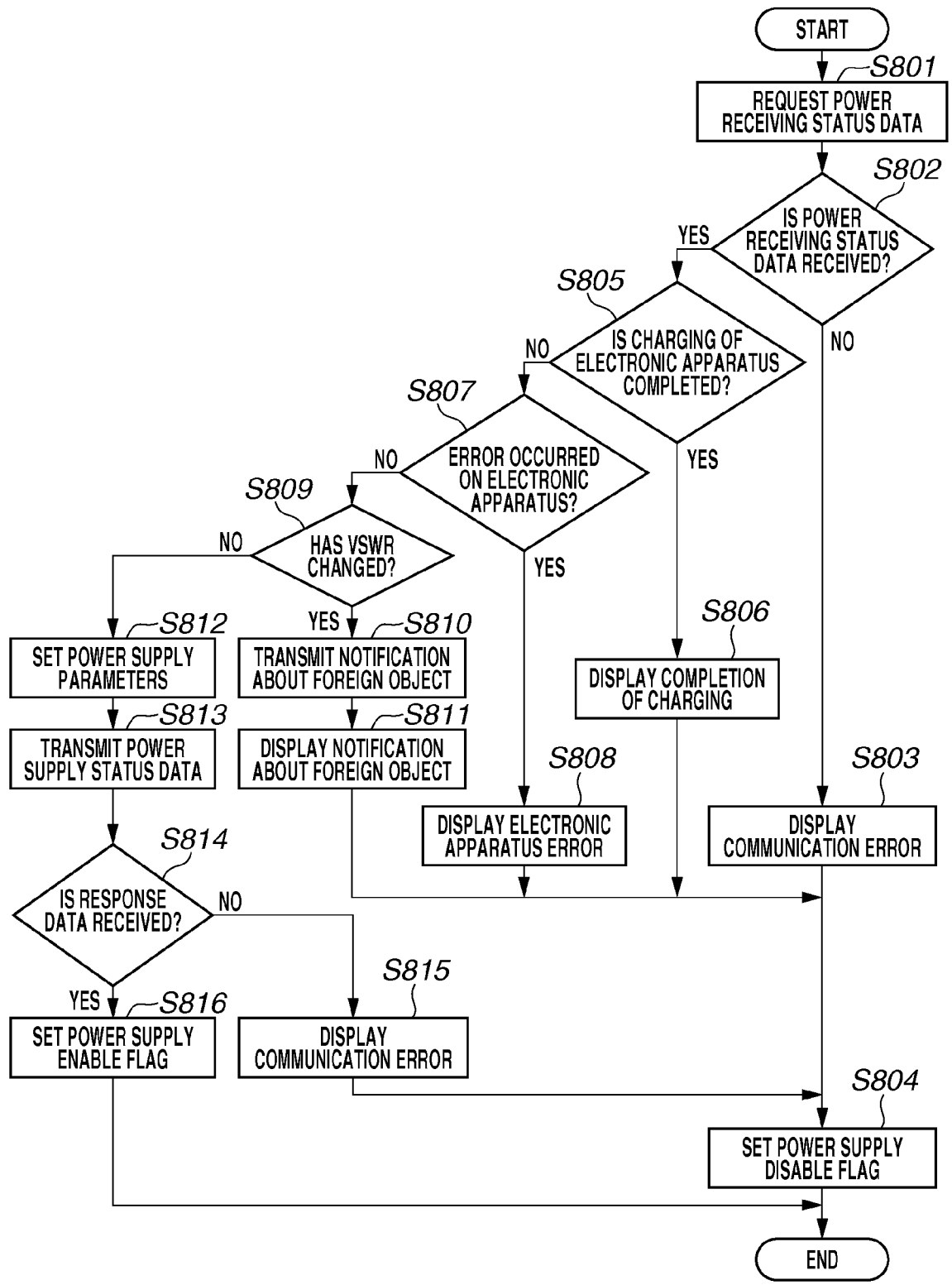
FIG. 8 is a flowchart illustrating an example of status data exchange processing performed by the power supply apparatus according to the first exemplary embodiment of the present invention.

The status data exchange processing performed by the control unit 101 in step S604 in FIG. 6 according to the first exemplary embodiment will be described below with reference to a flowchart illustrated in FIG. 8. The status data exchange processing is implemented when the control unit 101 executes a relevant computer program stored in the memory 108.

In step S801, the control unit 101 controls the first communication unit 106 to transmit data for requesting the power receiving status data to the electronic apparatus 200. Then, the processing proceeds to step S802.

In step S802, the control unit 101 determines whether the first communication unit 106 has received the power receiving status data from the electronic apparatus 200 during a time period since a request for the power receiving status data was transmitted to the electronic apparatus 200 until a predetermined time period has elapsed. When the control unit 101 determines that the first communication unit 106 has received the power receiving status data from the electronic apparatus 200 (YES in step S802), the processing proceeds to step S805. On the other hand, when the control unit 101 determines that the first communication unit 106 has not received the power receiving status data from the electronic apparatus 200 even when the predetermined time period has elapsed since the request for the power receiving status data was transmitted to the electronic apparatus 200 (NO in step S802), the processing proceeds to step S803.

In step S803, similar to step S706, the control unit 101 causes the display unit 109 to display data indicating that a communication error has been detected. Then, the processing proceeds to step S804.

In step S804, the control unit 101 sets the power supply disable flag to the memory 108. Then, the processing exits this flowchart and proceeds to step S605 in FIG. 6.

In step S805, based on the power receiving status data received by the first communication unit 106, the control unit 101 determines whether charging of the electronic apparatus 200 has been completed. When the control unit 101 determines that charging of the electronic apparatus 200 has been completed (YES in step S805), the processing proceeds to step S806. On the other hand, when the control unit 101 determines that charging of the electronic apparatus 200 is not completed (NO in step S805), the processing proceeds to step S807.

In step S806, the control unit 101 causes the display unit 109 to display data indicating that charging of the electronic apparatus 200 has been completed. The control unit 101 may display on the display unit 109 data indicating that the battery 211 has been fully charged. Then, the processing proceeds to step S804.

In step S807, based on the power receiving status data received by the first communication unit 106, the control unit 101 determines whether an error has occurred on the electronic apparatus 200. For example, the control unit 101 detects error data from the power receiving status data of the electronic apparatus 200 and analyzes the error data to determine whether an error has occurred on the electronic apparatus 200.

When the control unit 101 determines that an error has occurred on the electronic apparatus 200 (YES in step S807), the processing proceeds to step S808. On the other hand, when the control unit 101 determines that an error has not occurred on the electronic apparatus 200 (NO in step S807), the processing proceeds to step S809.

In step S808, the control unit 101 causes the display unit 109 to display data indicating that an error has occurred on the electronic apparatus 200. The control unit 101 may display on the display unit 109 data indicating the type of the error occurred on the electronic apparatus 200. Then, the processing proceeds to step S804.

In step S809, similar to step S708, the control unit 101 determines whether the VSWR detected by the detection unit 104 has changed by the predetermined value or more. When the VSWR detected by the detection unit 104 has changed by the predetermined value or more (YES in step S809), the processing proceeds to step S810. On the other hand, when the VSWR detected by the detection unit 104 has not changed by the predetermined value or more (NO in step S809), the processing proceeds to step S812.

In step S810, the control unit 101 controls the first communication unit 106 to transmit data for notifying the electronic apparatus 200 that a foreign object was detected. Then, the processing proceeds to step S811.

In step S811, the control unit 101 causes the display unit 109 to display data for notifying that a foreign object has been detected. Then, the processing proceeds to step S804.

In step S812, the control unit 101 sets the power supply parameters based on the power receiving status data received by the first communication unit 106. The power supply parameters include the predetermined power value and the predetermined time period. For example, the control unit 101 sets the predetermined power value and the predetermined time period based on the power requested by the electronic apparatus 200 and the efficiency of the power supply from the power supply apparatus 100 to the electronic apparatus 200. The efficiency of the power supply from the power supply apparatus 100 to the electronic apparatus 200 indicates the ratio of the power received by the electronic apparatus 200 to the power output by the power supply apparatus 100. Further, for example, the control unit 101 may set the predetermined power value and the predetermined time period based on the remaining capacity of the battery 211. The control unit 101 stores the set power supply parameters in the memory 108. Then, the processing proceeds to step S813.

In step S813, the control unit 101 controls the first communication unit 106 to transmit the power supply status data to the electronic apparatus 200. The control unit 101 generates the power supply status data including the identification data of the power supply apparatus 100, the power supply parameters set in step S812, and data indicating that the transmission of the predetermined power to the electronic apparatus 200 is to be started. The control unit 101 further controls the first communication unit 106 to transmit the generated power supply status data to the electronic apparatus 200. Then, the processing proceeds to step S814.

When the power supply status data transmitted from the power supply apparatus 100 is stored in the RTD data for WPT 400, the first communication unit 206 transmits to the power supply apparatus 100 data indicating that the power supply status data has been normally written to the RTD data for WPT 400.

In step S814, the control unit 101 determines whether the first communication unit 106 has received the response data from the electronic apparatus 200 during a time period since the power supply status data was transmitted until the predetermined time period has elapsed. When the control unit 101 determines that the first communication unit 106 has received the response data from the electronic apparatus 200 (YES in step S814), the processing proceeds to step S816. On the other hand, when the control unit 101 determines that the first communication unit 106 has not received the response data from the electronic apparatus 200 even when the predetermined time period has elapsed since the power supply status data has been transmitted (NO in step S814), the processing proceeds to step S815. Also when the response data received by the first communication unit 106 from the electronic apparatus 200 indicates that the power supply status data has not been normally written to the RTD data for WPT 400, the processing proceeds to step S815.

In step S815, similar to step S706, the control unit 101 causes the display unit 109 to display data indicating that a communication error has been detected. Then, the processing proceeds to step S804.

In step S816, the control unit 101 sets the power supply enable flag to the memory 108. Then, the processing exits this flowchart and proceeds to step S605 in FIG. 6.

In step S809, although the control unit 101 determines whether the VSWR detected by the detection unit 104 has changed by the predetermined value or more, the processing is not limited thereto.

In step S809, the control unit 101 may detect whether the current detected by the current detection unit 111 is equal to or larger than the predetermined current value. When the current detected by the current detection unit 111 is equal to or larger than the predetermined current value, the processing of the flowchart in FIG. 8 proceeds to step S810 from S809 similar to the case where the VSWR has changed by the predetermined value or more (YES in step S809). On the other hand, when the current detected by the current detection unit 111 is smaller than the predetermined current value, the processing of the flowchart in FIG. 8 proceeds to step S812 from S809 similar to the case where the VSWR has not changed by the predetermined value or more (NO in step S809).

In step S809, the control unit 101 may detect whether the temperature detected by the temperature detection unit 112 is equal to or higher than the predetermined temperature. When the temperature detected by the temperature detection unit 112 is equal to or higher than the predetermined temperature, the processing of the flowchart in FIG. 8 proceeds to step S810 from S809 similar to the case where the VSWR has changed by the predetermined value or more (YES in step S809). On the other hand, when the temperature detected by the temperature detection unit 112 is lower than the predetermined temperature, the processing of the flowchart in FIG. 8 proceeds to step S812 from S809 similar to the case where the VSWR has not changed by the predetermined value or more (NO in step S809).

<Power Supply Processing>

Figure 9:
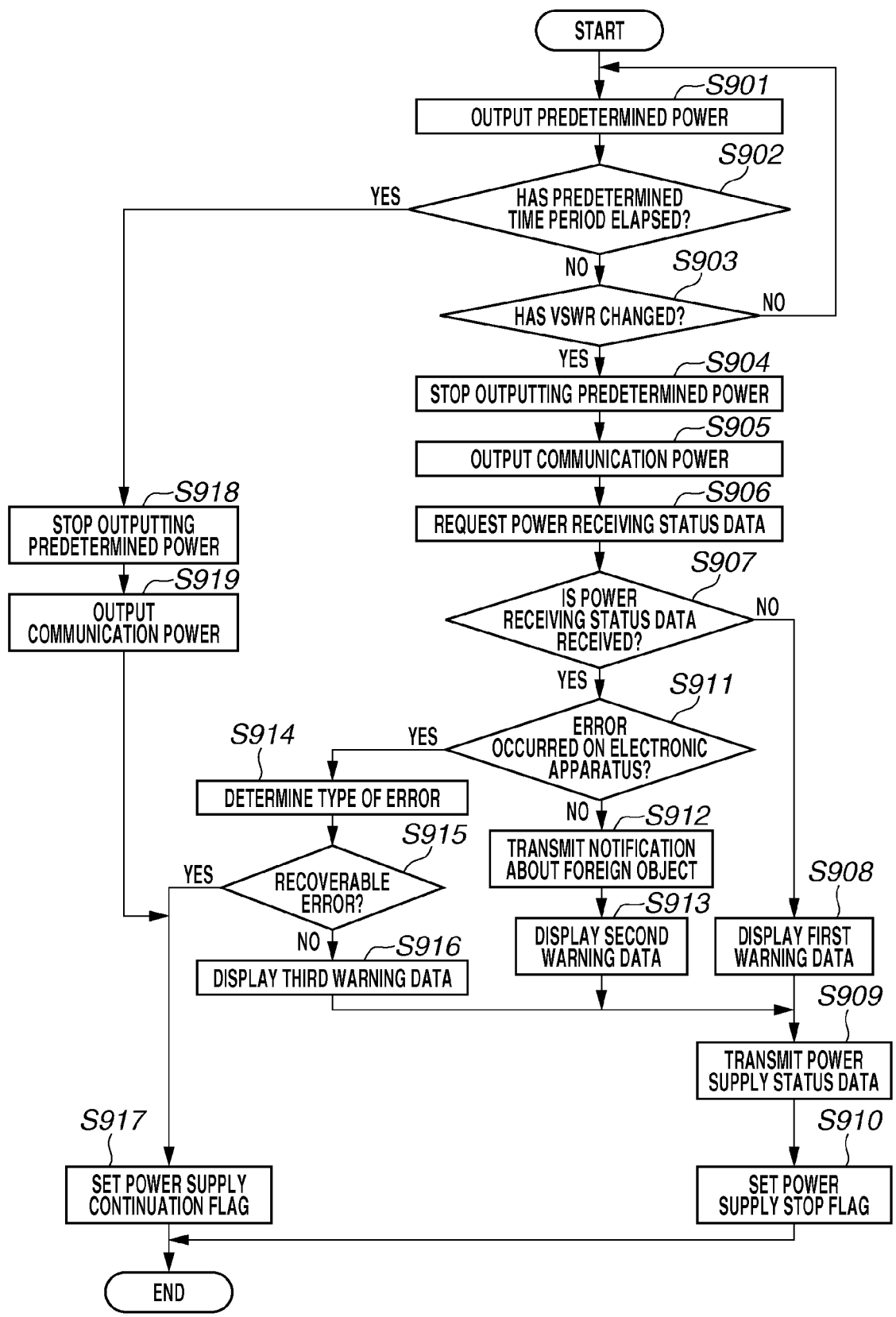
FIG. 9 is a flowchart illustrating an example of power supply processing performed by the power supply apparatus according to the first exemplary embodiment of the present invention.

The power supply processing performed by the control unit 101 in step S606 in FIG. 6 according to the first exemplary embodiment will be described below with reference to a flowchart illustrated in FIG. 9. The power supply processing is implemented when the control unit 101 executes a relevant computer program stored in the memory 108.

In step S901, based on the power supply parameters set in step S812, the control unit 101 controls the power supply unit 102 to output the predetermined power. The control unit 101 further controls the matching circuit 105 to set the resonance frequency of the power transmitting antenna 107 to the predetermined frequency f. The control unit 101 further controls the timer 101a to measure the time elapsed since the predetermined power was output. Then, the processing proceeds to step S902.

In step S902, based on the elapsed time measured by the timer 101a, the control unit 101 determines whether the predetermined time period has elapsed since the predetermined power was output. When the time measured by the timer 101a is equal to or longer than the predetermined time period, the control unit 101 determines that the predetermined time period has elapsed since the predetermined power was output (YES in step S902), and the processing proceeds to step S918. On the other hand, when the time measured by the timer 101a is shorter than the predetermined time period, the control unit 101 determines that the predetermined time period has not elapsed since the predetermined power was output (NO in step S902), and the processing proceeds to step S903.

In step S903, similar to step S708, the control unit 101 determines whether the VSWR detected by the detection unit 104 has changed by the predetermined value or more. When the VSWR detected by the detection unit 104 has changed by the predetermined value or more (YES in step S903), the processing proceeds to step S904. On the other hand, when the VSWR detected by the detection unit 104 has not changed by the predetermined value or more (NO in step S903), the processing returns to step S901.

In step S904, the control unit 101 controls the power supply unit 102 to stop outputting the predetermined power. Then, the processing proceeds to step S905.

In step S905, the control unit 101 controls the power supply unit 102 to output the communication power. The control unit 101 further controls the matching circuit 105 to set the resonance frequency of the power transmitting antenna 107 to the predetermined frequency f. Then, the processing proceeds to step S906.

In step S906, similar to step S801, the control unit 101 controls the first communication unit 106 to transmit data for requesting the power receiving status data to the electronic apparatus 200. Then, the processing proceeds to step S907.

In step S907, similar to step S802, the control unit 101 determines whether the first communication unit 106 has received the power receiving status data from the electronic apparatus 200 during the time period since the request for the power receiving status data was transmitted to the electronic apparatus 200 until the predetermined time period has elapsed. When the control unit 101 determines that the first communication unit 106 has received the power receiving status data from the electronic apparatus 200 (YES in step S907), the processing proceeds to step S911. On the other hand, when the control unit 101 determines that the first communication unit 106 has not received the power receiving status data from the electronic apparatus 200 even when the predetermined time period has elapsed since the request for the power receiving status data was transmitted to the electronic apparatus 200 (NO in step S907), the processing proceeds to step S908.

On the other hand, when the first communication unit 106 has not received the power receiving status data from the electronic apparatus 200 (NO in step S907), the electronic apparatus 200 may have possibly been removed from the predetermined range 300. Further, when the first communication unit 106 has not received the power receiving status data from the electronic apparatus 200 (NO in step S907), the first communication unit 206 of the electronic apparatus 200 may possibly have entered a state where it cannot perform communication.

In step S908, therefore, the control unit 101 causes the display unit to display first warning data. The first warning data is used to, for example, notify the user that the power supply apparatus 100 will stop supplying the predetermined power to the electronic apparatus 200 because the communication between the first communication unit 106 and the first communication unit 206 is disabled. The first warning data may also be used to prompt the user to place the electronic apparatus 200 in the predetermined range 300 again to supply the predetermined power to the electronic apparatus 200. The first warning data may also be used to prompt the user to operate the power supply apparatus 100 from the operation unit 110 to supply the predetermined power to the electronic apparatus 200 again. When the first warning data is displayed, the processing proceeds to step S909.

In step S909, the control unit 101 controls the first communication unit 106 to transmit the power supply status data to the electronic apparatus 200. The control unit 101 generates the power supply status data including the identification data of the power supply apparatus 100 and data indicating that the transmission of the predetermined power to the electronic apparatus 200 is to be stopped. The control unit 101 further controls the first communication unit 106 to transmit the generated power supply status data to the electronic apparatus 200. Then, the processing proceeds to step S910.

In step S910, the control unit 101 sets the power supply stop flag to the memory 108. Then, the processing exits this flowchart and proceeds to step S607 in FIG. 6.

In step S911, similar to step S807, based on the power receiving status data received by the first communication unit 106, the control unit 101 determines whether an error has occurred on the electronic apparatus 200. When the control unit 101 determines that an error has occurred on the electronic apparatus 200 (YES in step S911), the processing proceeds to step S914. On the other hand, when the control unit 101 determines that an error has not occurred on the electronic apparatus 200 (NO in step S911), the processing proceeds to step S912.

In step S912, similar to step S810, the control unit 101 controls the first communication unit 106 to transmit the data for notifying the electronic apparatus 200 that a foreign object has been detected. Then, the processing proceeds to step S913.

When the control unit 101 determines that an error has not occurred on the electronic apparatus 200 (NO in step S911), a foreign object may possibly exist in the predetermined range 300.

In step S913, the control unit 101 causes the display unit 109 to display second warning data. The second warning data is used to, for example, notify the user that the power supply apparatus 100 will stop supplying the predetermined power to the electronic apparatus 200 because a foreign object exists in the predetermined range 300. The second warning data may also be used to prompt the user to remove the foreign object from the inside of the predetermined range 300 to supply the predetermined power to the electronic apparatus 200 again. The second warning data may also be used to prompt the user to operate the power supply apparatus 100 from the operation unit 110 to supply the predetermined power to the electronic apparatus 200 again. When the second warning data is displayed, the processing proceeds to step S909.

In step S914, based on the power receiving status data received by the first communication unit 106, the control unit 101 determines the type of the error occurred on the electronic apparatus 200. Then, the processing proceeds to step S915.

In step S915, the control unit 101 determines whether the error occurred on the electronic apparatus 200 is a recoverable error. For example, if the error occurred on the electronic apparatus 200 is the first error, the control unit 201 determines that the error occurred on the electronic apparatus 200 is an unrecoverable error. If the error occurred on the electronic apparatus 200 is the second error, the control unit 201 determines that the error occurred on the electronic apparatus 200 is a recoverable error. If the error occurred on the electronic apparatus 200 is the third error, the control unit 201 determines that the error occurred on the electronic apparatus 200 is an unrecoverable error. If the error occurred on the electronic apparatus 200 is the fourth error, the control unit 101 determines that the error occurred on the electronic apparatus 200 is an unrecoverable error.

If the error occurred on the electronic apparatus 200 is determined to be an unrecoverable error (NO in step S915), the processing proceeds to step S916. On the other hand, if the error occurred on the electronic apparatus 200 is determined to be a recoverable error (YES in step S915), the processing proceeds to step S917.

If the error occurred on the electronic apparatus 200 is determined to be an unrecoverable error (NO in step S915), an unrecoverable error may possibly have occurred on the electronic apparatus 200.

In step S916, the control unit 101 causes the display unit 109 to display the third warning data. The third warning data is used to, for example, notify the user that the power supply apparatus 100 will stop supplying the predetermined power to the electronic apparatus 200 because an error has occurred on the electronic apparatus 200. The third warning data may also be used to prompt the user to check the error occurred on the electronic apparatus 200 to supply the predetermined power to the electronic apparatus 200 again. The third warning data may also be used to prompt the user to operate the power supply apparatus 100 from the operation unit 110 to supply the predetermined power to the electronic apparatus 200 again.

When the third error was detected to have occurred on the electronic apparatus 200, in step S916, the control unit 101 may cause the display unit 109 to display the third warning data for prompting the user to attach the battery 211 to the electronic apparatus 200.

When the third warning data is displayed, the processing proceeds to step S909.

In step S917, the control unit 101 sets the power supply continuation flag to the memory 108. Then, the processing exits this flowchart and proceeds to step S607 in FIG. 6.

In step S918, similar to step S904, the control unit 101 controls the power supply unit 102 to stop outputting the predetermined power. Then, the processing proceeds to step S919.

In step S919, the control unit 101 controls the power supply unit 102 to output the communication power. The control unit 101 further controls the matching circuit 105 to set the resonance frequency of the power transmitting antenna 107 to the predetermined frequency f. Then, the processing proceeds to step S917.

Although the control unit 101 determines whether the VSWR detected by the detection unit 104 has changed by the predetermined value or more in step S903, the processing is not limited thereto.

In step S903, the control unit 101 may detect whether the current detected by the current detection unit 111 is equal to or larger than the predetermined current value. When the current detected by the current detection unit 111 is equal to or larger than the predetermined current value, the processing of the flowchart in FIG. 9 proceeds to step S904 from S903 similar to the case where the VSWR has changed by the predetermined value or more (YES in step S903). On the other hand, when the current detected by the current detection unit 111 is smaller than the predetermined current value, the processing of the flowchart in FIG. 9 returns to step S901 from S903 similar to the case where the VSWR has not changed by the predetermined value or more (NO in step S903).

In step S903, the control unit 1201 may detect whether the temperature detected by the temperature detection unit 112 is equal to or higher than the predetermined temperature. When the temperature detected by the temperature detection unit 112 is equal to or higher than the predetermined temperature, the processing of the flowchart in FIG. 9 proceeds to step S904 from S903 similar to the case where the VSWR has changed by the predetermined value or more (YES in step S903). On the other hand, when the temperature detected by the temperature detection unit 112 is lower than the predetermined temperature, the processing of the flowchart in FIG. 9 returns to step S901 from S903 similar to the case where the VSWR has not changed by the predetermined value or more (NO in step S903).

Thus, the power supply apparatus 100 according to the first exemplary embodiment performs authentication for the wireless power supply between the power supply apparatus 100 and the electronic apparatus 200 according to the communication with the electronic apparatus 200, and controls whether to supply power wirelessly to the electronic apparatus 200 based on the result of the authentication. Therefore, the power supply apparatus 100 wirelessly supplies power to the electronic apparatus 200 which has successfully authenticated for the wireless power supply, and thus the electronic apparatus 200 which has not been successfully authenticated for the wireless power supply can be protected.

The power supply apparatus 100 further detects the status of the electronic apparatus 200 according to the communication with the electronic apparatus 200, and performs control whether to supply power wirelessly to the electronic apparatus 200 based on the detected status of the electronic apparatus 200. Therefore, the power supply apparatus 100 wirelessly supplies power to the electronic apparatus 200 capable of detecting the power receiving status, and thus the electronic apparatus 200 not capable of detecting the power receiving status can be protected. The power supply apparatus 100 further wirelessly supplies power to the electronic apparatus 200 in which an error has not occurred, and thus the electronic apparatus 200 in which an error has occurred can be protected. The power supply apparatus 100 further wirelessly supplies power to the electronic apparatus 200 to which charging is not completed, and thus the electronic apparatus 200 to which charging is completed can be protected.

While the power supply apparatus 100 is supplying the predetermined power to the electronic apparatus 200, the power supply apparatus 100 detects whether an error related to charging or to power supply has occurred on the electronic apparatus 200 through at least one of the detection unit 104, the current detection unit 111, and the temperature detection unit 112. When the power supply apparatus 100 detects that an error related to charging or to power supply has occurred on the electronic apparatus 200 through at least one of the detection unit 104, the current detection unit 111, and the temperature detection unit 112, the power supply apparatus 100 stops outputting the predetermined power, and communicates with the electronic apparatus 200. Thus, the power supply apparatus 100 can correctly detect the type of the error occurred on the electronic apparatus 200 through the communication with the electronic apparatus 200, and suitably control the power supply to the electronic apparatus 200 according to the type of the error of the electronic apparatus 200.

Therefore, the power supply apparatus 100 according to the first exemplary embodiment can suitably perform wireless power supply to the electronic apparatus 200 according to the communication between the power supply apparatus 100 and the electronic apparatus 200.

Although, in the first exemplary embodiment, the power supply apparatus 100 supplies the predetermined power to the electronic apparatus 200 by using the power transmitting antenna 107, and performs communication between the first communication unit 106 and the electronic apparatus 200 by using the power transmitting antenna 107, the configuration is not limited thereto. For example, the power supply apparatus 100 may include an antenna for supplying the predetermined power to the electronic apparatus 200, and an antenna for performing communication between the first communication unit 106 and the electronic apparatus 200.

Although the electronic apparatus 200 receives power from the power supply apparatus 100 by using the power receiving antenna 203, and performs communication between the power supply apparatus 100 and the first communication unit 206 by using the power receiving antenna 203, the configuration is not limited thereto. For example, the electronic apparatus 200 may include an antenna for receiving power from the power supply apparatus 100, and an antenna for performing communication between the power supply apparatus 100 and the first communication unit 206.

Although the first communication unit 106 is described to operate as a reader writer conforming to the NFC Standard, the first communication unit 106 is not limited thereto. For example, the first communication unit 106 may operate on a Peer To Peer (P2P) basis conforming to the NFC Standard.

Although, in the first exemplary embodiment, the predetermined power supply method is described as a power supply method using the magnetic resonance method, the predetermined power supply method may be a power supply method using the electromagnetic induction method. The predetermined power supply method may also be a power supply method conforming to a standard (for example, the "Qi" Standard) specified in the Wireless Power Consortium (WPC). The predetermined power supply method may also be a power supply method using a standard specified in the Broadband Wireless Forum (BWF). The predetermined power supply method may also be a power supply method using a standard specified in the Alliance for Wireless Power (A4WP).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power supply apparatus comprising:
a power supply interface; and
a communication interface;
a processor, wherein the processor performs following processes:
controlling the communication interface to establish communication with an electronic apparatus;
controlling, after the communication with the electronic apparatus is established, the communication interface to receive authentication information from the electronic apparatus before controlling the power supply interface to perform a power supply process for supplying a power to the electronic apparatus via the power supply interface, wherein the power to the electronic apparatus is controlled based on power receiving status data in the power supply process;
determining, after the authentication information is received and based on the authentication information, whether the electronic apparatus is capable of detecting the power receiving status data and providing the power receiving status data to the power supply apparatus;
performing the power supply process in a case where the electronic apparatus is capable of detecting the power receiving status data and providing the power receiving status data to the power supply apparatus; and
not performing the power supply process in a case where the electronic apparatus is not capable of detecting the power receiving status data and providing the power receiving status data to the power supply apparatus.

2. The power supply according to claim 1, wherein the processor further performs a following process:
In the case where the electronic apparatus is capable of detecting the power receiving status data and providing the power receiving status data to the power supply apparatus, performing control to supply power to the electronic apparatus according to the authentication information.

3. The power supply apparatus according to claim 1, wherein the authentication information includes information about a battery connected to the electronic apparatus.

4. The power supply apparatus according to claim 1, wherein the authentication information includes information for notifying an error about the electronic apparatus.

5. A method for a power supply apparatus having a power supply interface and a communication interface, the method comprising:
controlling the communication interface to establish a communication with an electronic apparatus;
receiving, after the communication with the electronic apparatus is established, authentication information from the electronic apparatus before controlling the power supply interface to perform a power supply process for supplying a power to the electronic apparatus via the power supply interface, wherein the power to the electronic apparatus is controlled based on power receiving status data in the power supply process;

determining, after the authentication information is received and based on the authentication information, whether the electronic apparatus is capable of detecting the power receiving status data and providing the power receiving status data to the power supply apparatus;

performing the power supply process in a case where the electronic apparatus is capable of detecting the power receiving status data and providing the power receiving status data to the power supply apparatus; and not performing the power supply process in a case where the electronic apparatus is not capable of detecting the power receiving status data and providing the power receiving status data to the power supply apparatus.

6. A recording medium recording a program for causing a computer having a power supply interface and a communication interface to execute a method, the method comprising:

controlling the communication interface to establish a communication with an electronic apparatus;

receiving, after the communication with the electronic apparatus is established, authentication information from the electronic apparatus before controlling the power supply interface to perform a power supply process for supplying a power to the electronic apparatus via the power supply interface, wherein the power to the electronic apparatus is controlled based on power receiving status data in the power supply process;

determining, after the authentication information is received and based on the authentication information, whether the electronic apparatus is capable of detecting the power receiving status data and providing the power receiving status data to the power supply apparatus;

performing the power supply process in a case where the electronic apparatus is capable of detecting the power receiving status data and providing the power receiving status data to the power supply apparatus; and not performing the power supply process in a case where the electronic apparatus is not capable of detecting the power receiving status data and providing the power receiving status data to the power supply apparatus.

7. The power supply apparatus according to claim 1, wherein the power supply process includes a foreign object detection process.

8. The method according to claim 5, further comprising:
in the case where the electronic apparatus is capable of detecting the power receiving status data and providing the power receiving status data to the power supply apparatus, performing control to supply power to the electronic apparatus according to the authentication information.

9. The method according to claim 5, wherein the authentication information includes information about a battery connected to the electronic apparatus.

10. The method according to claim 5, wherein the authentication information includes information for notifying an error about the electronic apparatus.

11. The method according to claim 5, wherein the power supply process includes a foreign object detection process.

* * * * *